Oct. 4, 1932.  J. M. PRENTICE  1,881,242
ELECTRICALLY OPERATED AMUSEMENT AND EDUCATIONAL DEVICE
Filed Oct. 22, 1929   2 Sheets-Sheet 1

Fig. 1.

| Puzzle No. 53221. | | | | |
|---|---|---|---|---|
| 1 | Who was the second President of the United States? ||||
| 2 | " " " first Secretary of the Treasury? ||||
| 3 | " " " man who shot Lincoln? ||||
| 4 | What President graduated from Stamford University? ||||
| 5 | Who was the first Vice-President of the United States? ||||
| | 1 | 2 | 3 | 4 | 5 |
| A | Jefferson | Jefferson | Jesse James | Coolidge | Adams |
| B | Adams | Washington | Booth | Hoover | Jefferson |
| C | Hamilton | Lincoln | Chapman | Cleveland | Taft |
| D | Washington | Adams | Anderson | Taft | Lincoln |
| E | Lincoln | Hamilton | Harding | Harding | Hamilton |

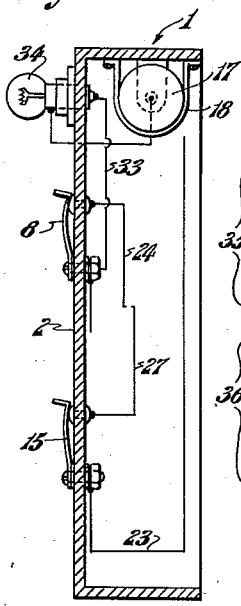

| Puzzle No. 34521. | | | | |
|---|---|---|---|---|
| 1 | The Maple Leaf is the Emblem of what Country? ||||
| 2 | What is the Name of the Calendar in General Use? ||||
| 3 | Who was the Only Bachelor President of the United States? ||||
| 4 | Who was the First English King? ||||
| 5 | Who were the Amazons? ||||
| | 1 | 2 | 3 | 4 | 5 |
| A | United States | English | J.Q. Adams | John | Female Warriors ˣ |
| B | England | Old English | Jackson | Egbert ˣ | Scotch Infantry |
| C | Canada ˣ | Gregorian ˣ | Johnson | James | Green Infantry |
| D | China | American | Washington | Arthur | Scotch Sailors |
| E | Australia | German | Buchanan ˣ | Henry | Canadian Sharpshooters |

INVENTOR,
James M. Prentice,
BY
Harry W. Bowen.
ATTORNEY.

Oct. 4, 1932.   J. M. PRENTICE   1,881,242
ELECTRICALLY OPERATED AMUSEMENT AND EDUCATIONAL DEVICE
Filed Oct. 22, 1929   2 Sheets-Sheet 2

INVENTOR,
James M. Prentice,
BY
Harry W. Bowen.
ATTORNEY.

Patented Oct. 4, 1932

1,881,242

UNITED STATES PATENT OFFICE

JAMES MASON PRENTICE, OF HOLYOKE, MASSACHUSETTS

ELECTRICALLY OPERATED AMUSEMENT AND EDUCATIONAL DEVICE

Application filed October 22, 1929. Serial No. 401,477.

This invention relates to improvements in electrically operated amusement and educational devices.

An object of the present invention is to provide a device of such a nature that it will not only furnish amusement for the user, but will, at the same time, serve as an instructive and educational means for testing the memory of the user and his general knowledge or education.

Briefly considered, it comprises two tables, or charts, one comprising a series of questions and the other a series of answers. For the purpose of utilizing the two tables, or charts, two series of groups of electrical contacts and circuit closing means for the contacts are provided. A suitable signal device, as a glow lamp or bell, is included in the circuit connections which will indicate to the user when the complete series of questions and answers are accurately answered, as will be fully described in the body of the specifications and particularly pointed out in the claims with reference to the accompanying drawings.

In the practical embodiment or carrying out of my invention, the two sets of contacts, circuit closing means, as lever switch arms, the signal device and electrical circuits are mounted on and secured to a suitable support, as a box-like member, the interior portion of which furnishes means for the wiring connections.

Referring to the drawings:

Fig. 1 indicates a chart or table showing the questions and answers.

Fig. 2 indicates another chart or table showing another set of questions and answers.

Fig. 5 is a detail sectional view on the line 5—5 of Fig. 4.

Figure 3:
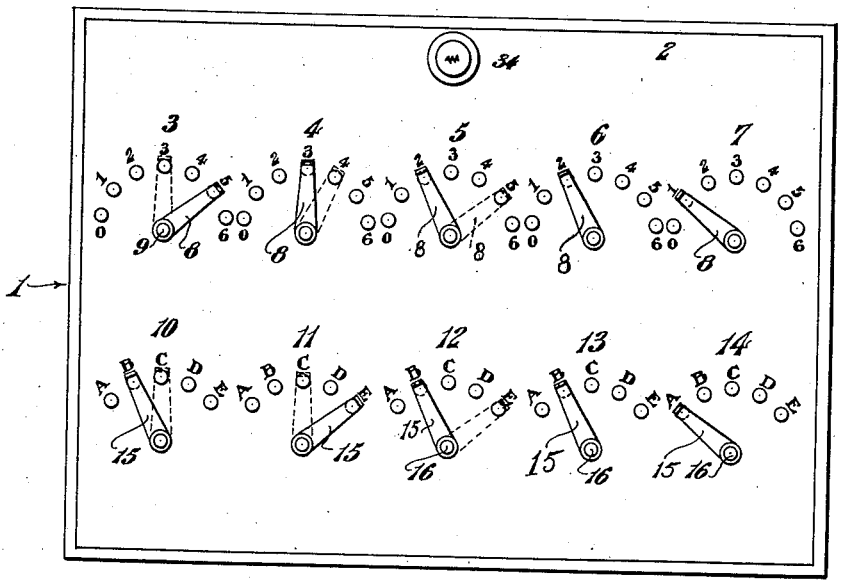
Fig. 3 is a top plan view of the container for the operative parts with the two sets of contacts and contact arms.

Referring to the drawings in detail:

1 designates the box or container, as a whole, having the cover 2 on which the series of groups of electrical contacts 3, 4, 5, 6 and 7 are located and secured. 8 are movable contact levers that turn on the pivots 9 of each group.

10, 11, 12, 13 and 14 are a second series of groups of electrical contacts. 15 designates the movable contact levers that engage the contacts of this second series of groups which turn on the pivots 16. 17 is a dry cell battery that is secured to the interior of the box by means of the clamp 18. 19 are threaded brackets carrying the contact screws 20.

For the purpose of clearly following the circuits, the wires which connect each one of the contacts 1, 2, 3, 4 and 5 of each of the groups 3, 4, 5, 6 and 7 are connected to each of the contacts of the second series of groups 10, 11, 12, 13 and 14, which have the same numerals, namely, 1, 2, 3, 4 and 5. Each of these contacts in each of the groups 10, 11, 12, 13 and 14 is also designated with the capital letters A. B. C. D. and E., in order to correspond or check up with the answers on the chart, shown in Fig. 1 having these same capital letters.

Referring now to Fig. 1, which shows the chart or puzzle embodying the educational exercise, this chart is arbitrarily numbered "53221". The five questions are designated on this chart by the bracketed numeral 21 opposite the numerals 1, 2, 3, 4 and 5, on the horizontal lines, and the answers are designated by the bracketed numeral 22 opposite the letters A B C D and E on the horizontal lines.

The device is operated as follows: The operator first places each of the contact levers 8 on a contact of the groups 3, 4, 5, 6 and 7, which correspond with the numerals in the puzzle numbers,—5, 3, 2, 2, 1—, as shown in full lines in Fig. 3. Next, the operator refers to the questions on the chart shown in Fig. 1. The first question of group 21 is: "Who was the second President of the United States?" In order to answer this question, the operator must now exercise his knowledge of history and select his answer from the group indicated at 22 on one of the lines designed A. B. C. D. or E., and in column "1". As the correct answer is "Adams"

on the horizontal line "B", he now turns the contact lever 15 of the contact group 10 to engage the "B" contact. The next question on line 2 of the chart in Fig. 1 is: "Who was the first Secretary of the Treasury?", which is shown on horizontal line "2" of group 21. The answer, as before, is to be selected from one of the names on the horizontal lines A B C D or E, Group 22 and in the vertical column "2", which column corresponds in number with the second question on line "2" of group 21. As the correct answer is Hamilton on line "E", the lever 15, shown in full lines in Fig. 3 is placed on the contact E of group 11. In this way, all of the answers to the questions on the chart shown in Fig. 1 are answered and the levers 15 of Fig. 3 are positioned or placed respectively with reference to the lettered contacts B. E. B. B. and A. of the groups 10, 11, 12, 13 and 14. As these are the correct answers, the electrical circuit is complete as follows:—battery 17, wire 23, contact lever 15 and contact B of group 10, wire 24 from this contact to contact 3 of group 4, lever 8, wire 25 to lever 8 of group 3, contact 5 of this group, wire 26 to contact 5 of group 12, lever 15, wire 27, lever 15 of group 11, contact 2, wire 28 to contact 2 of group 5, lever 8, wire 29, lever 8 of group 6 and contact 2 thereof, wire 30 to contact A of group 14, lever 15, wire 31, lever 15 of group 13, contact B, wire 32, from contact 1 of this group to contact 1 of group 7, lever 8, wire 33 to the lamp 34 and the other terminal of the battery. It will, therefore, be seen that unless the correct answers in group 22 selected from the five columns and the levers 15 are properly placed to agree with the letters A B C D and E, the light 34 will not glow. In other words, the operator is put to a very accurate mental test in selecting his answers from the chart 22. There is, therefore, more chances of error arising than correctness. Should any one of the levers 15 not be correctly located, the lamp 34 will not glow. There are 3,125 possible combinations with the five levers 15, the five answers on lines A B C D and E and the five vertical columns of group 22.

Referring to the second puzzle, numbered "34521" of the chart shown in Fig. 2: The levers 8 of Fig. 3 are placed in the dotted line positions on the respective contacts 3, 4, 5, 2 and 1 of which corresponds with this puzzle number—34521—of Fig. 2.

Figure 4:
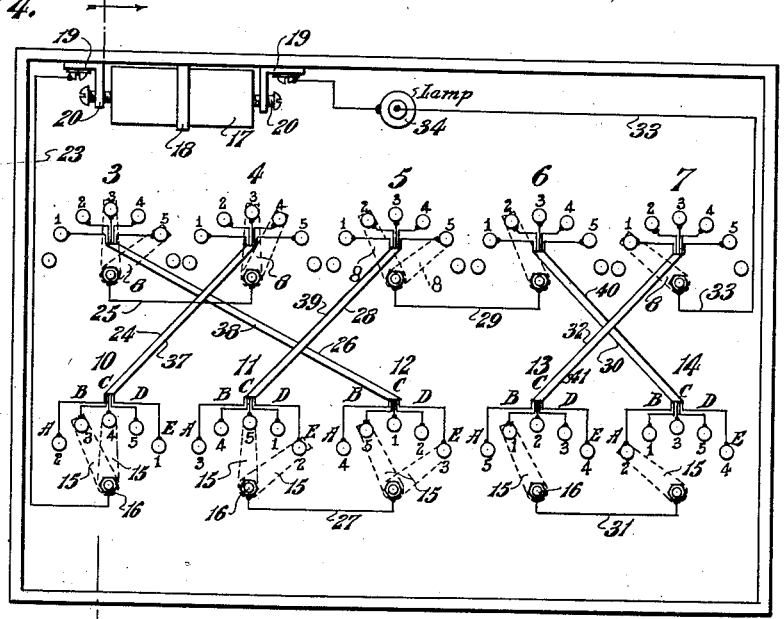
Fig. 4 is a view of the interior construction with the cover removed, showing the electrical connections.

The questions are indicated by the bracketed reference numeral 35 and the answers by the bracket reference numeral 36. This chart is used in the same manner as that already described. The first question: "The maple leaf is the emblem of what country?" The answer is found on one of the horizontal lines A B C D or E and in the vertical column "1" to agree with the first question on line "1" of group 35. As the answer is— Canada—on line C, the lever 15 of Figs. 3 and 4 are placed on the "C" contact. The second question: "What is the name of the calendar in general use?" As the answer is— "Gregorian" found on line C of vertical column "2", the lever 15 of group 11 is placed on the C contact. The remaining questions and answers are solved in the same manner with the levers 15 on the contacts shown in Fig. 4. The electric circuit is as follows: battery 17, wire 23, lever 15, contact C, wire 37 from contact 4 to contact 4 of group 4, lever 8, wire 25, lever 8, group 3, contact 3, wire 38 to contact B, lever 15, wire 27, lever 15, contact C, wire 39 from contact 5 to contact 5 of group 5, lever 8, wire 29, lever 8, contact 2, group 6, wire 40 to contact A, lever 15, wire 31, lever 15, contact B, wire 41 to contact 1 of group 7 and wire 33 to the lamp 34 and battery 18.

It will be seen from the description that I have worked out an amusement and educational device that is capable of wide use in affording a mental test for the user. In practice, the levers 8 are arbitrarily set for any puzzle number, as shown. Then the answers are worked out with reference to the questions in order to make the electrical circuits complete.

What I claim is:

1. In a device for the purpose described, an educational chart bearing an arbitrary key number, a series of groups of electrical contacts, a manually operated contact lever for each group, the contacts being designated to correspond with numerals composing the key number, the said chart having a series of questions and a series of answers therefor, the answers being contained in columns which correspond in number with the questions, and a second series of groups of electrical contacts, corresponding with the answers, a manually operated contact lever for each group, electrical connections between the two series of groups of contacts and a signal device in the connections for indicating when the several correct answers are determined by the correct positioning of the second series of contact levers.

2. An amusement and educational device for the purpose described comprising a supporting member, two series of groups of designated electrical contacts on said member, a closure contact lever for each contact of each group, a key or chart having an arbitrary key number, a wire connecting each one of the contacts of one group with a contact of another group, the levers of some of the groups being electrically connected together, the end levers of each series of groups being respectively connected to the terminals of a source of electrical energy, and a signal device in the said last mentioned connection which will operate, when each of the levers is on a certain designated contact, as determined with reference to said key or chart device.

3. A device for the purpose described comprising a question and answer chart, having numbers, a series of groups of designated contacts that correspond in number with the numbers on the question and answer chart, a second series of groups of designated contacts which correspond in number with the number of questions on the said chart, manually operated means for electrically connecting the contacts of each series, a signal device in the connections, whereby when the correct contact of the second series is closed, with reference to the questions and answers, the signal device will operate.

4. In a device of the kind described, a plurality of series of groups of numbered electrical contacts, a reference chart having numbers a separate manually operated contact lever for each group of each series, a source of electrical energy, connections from the source to one of the series, cross connections from the contacts of one series to the contacts of the other, a signal device in the completed connections made by the said contact lever, whereby, when the contact levers of each series are on the numbered contacts corresponding to the numbers on the chart, the circuit will be complete and the signal device will be operated.

In testimony whereof, I have hereunto signed my name at Durham, in the county of Strafford, and State of New Hampshire, this 15th day of October, 1929.

JAMES MASON PRENTICE.